(12) United States Patent
Rittenburg et al.

(10) Patent No.: US 9,170,416 B2
(45) Date of Patent: Oct. 27, 2015

(54) SCROLLING THIN FILM MAGNIFIER DEVICE

(75) Inventors: James Rittenburg, Perkasie, PA (US); Lorna Rittenburg, Perkasie, PA (US)

(73) Assignee: IC Optix, Perkasie, PA (US)

(*) Notice: Subject to any disclaimer, the term of this patent is extended or adjusted under 35 U.S.C. 154(b) by 315 days.

(21) Appl. No.: 13/450,973

(22) Filed: Apr. 19, 2012

(65) Prior Publication Data
US 2012/0268838 A1 Oct. 25, 2012

Related U.S. Application Data

(60) Provisional application No. 61/478,212, filed on Apr. 22, 2011.

(51) Int. Cl.
| | |
|---|---|
| *G02B 27/02* | (2006.01) |
| *G02B 25/02* | (2006.01) |
| *B43K 29/00* | (2006.01) |
| *B43K 29/10* | (2006.01) |
| *A45C 1/06* | (2006.01) |
| *A45C 11/24* | (2006.01) |
| *A45C 15/00* | (2006.01) |

(52) U.S. Cl.
CPC . *G02B 25/02* (2013.01); *A45C 1/06* (2013.01); *A45C 11/24* (2013.01); *A45C 15/00* (2013.01); *B43K 29/003* (2013.01); *B43K 29/10* (2013.01)

(58) Field of Classification Search
USPC ............ 359/802, 809, 811, 813, 815, 819, 359/822–824
See application file for complete search history.

(56) References Cited

U.S. PATENT DOCUMENTS

| | | | |
|---|---|---|---|
| 4,744,527 A | 5/1988 | Coote et al. | |
| 4,765,726 A | 8/1988 | Johnson | |
| 4,823,331 A * | 4/1989 | Yoshitoshi et al. | ........ 369/44.23 |
| 5,333,907 A | 8/1994 | Schaeffer | |
| 5,388,038 A | 2/1995 | Yang | |
| 5,650,215 A | 7/1997 | Mazurek et al. | |
| 5,754,349 A | 5/1998 | Hon | |
| 6,000,809 A | 12/1999 | Belo | |
| 6,113,295 A | 9/2000 | Bordelon | |
| 6,123,890 A | 9/2000 | Mazurek et al. | |
| 6,315,851 B1 | 11/2001 | Mazurek et al. | |
| 6,440,880 B2 | 8/2002 | Mazurek et al. | |
| 6,838,150 B2 | 1/2005 | Mazurek et al. | |
| 6,905,275 B1 | 6/2005 | Del Valle | |
| 6,947,225 B2 | 9/2005 | Sekiguchi et al. | |
| 7,139,136 B2 | 11/2006 | Waggoner et al. | |
| 7,448,817 B2 | 11/2008 | Lin | |

(Continued)

OTHER PUBLICATIONS

Cray et al., 9. Silicone Release Coatings for the Pressure Sensitive Adhesive Industry. Inorganic Polymers. Nova Science Publishers, (2007) (7 pages).

Davies et al., "Application of precision diamond machining to the manufacture of micro-photonics components," Proc of SPIE. 5183:94-108 (2003).

(Continued)

*Primary Examiner* — Stephone B Allen
*Assistant Examiner* — Brandi Thomas
(74) *Attorney, Agent, or Firm* — Clark & Elbing LLP

(57) ABSTRACT

The invention features a scrolling thin film magnifier that is integrated into a composition and can be extended and retracted when used, compositions that include the scrolling thin film magnifier, methods of using the scrolling thin film magnifier to magnify printed indicia, and methods of manufacturing the scrolling thin film magnifier.

20 Claims, 13 Drawing Sheets

(56) References Cited

U.S. PATENT DOCUMENTS

| | | | |
|---|---|---|---|
| D598,952 S | 8/2009 | Kushner | |
| 7,632,880 B2 | 12/2009 | Li et al. | |
| 7,767,728 B2 | 8/2010 | Lu et al. | |
| 7,839,035 B2 | 11/2010 | Hwaung | |
| 2002/0101656 A1* | 8/2002 | Blumenthal et al. | 359/440 |
| 2003/0172564 A1* | 9/2003 | Perry et al. | 40/518 |
| 2003/0234208 A1* | 12/2003 | Huang | 206/710 |
| 2004/0202879 A1 | 10/2004 | Xia et al. | |
| 2005/0231828 A1 | 10/2005 | Bartone | |
| 2007/0229989 A1 | 10/2007 | Scott et al. | |
| 2009/0058288 A1* | 3/2009 | Bertram et al. | 313/504 |
| 2009/0080965 A1 | 3/2009 | Adamberry | |
| 2010/0177406 A1 | 7/2010 | Walker | |
| 2012/0243110 A1 | 9/2012 | Robinson | |
| 2012/0244910 A1* | 9/2012 | Hsu | 455/566 |

OTHER PUBLICATIONS

Davis et al., "Optical design using fresnel lenses," Optik & Photonik. 4:52-5 (2007).

Jahns et al., "Two-dimensional array of diffractive microlenses fabricated by thin film deposition," Applied Optics. 29(7):931-6 (1990) (Abstract Only) (2 pages).

Miller et al., "Thin sheet plastic fresnel lenses of high aperture," JOSA. 41(11):807-14 (1951) (Abstract Only) (1 page).

Ren et al., "Flat polymeric microlens array," Optics Communications. 261:296-9 (2006).

Rogers, "Magnifying roller blind for display terminal," Original Disclosure Information: TDB 07-82 p838 (1982) (2 pages).

Worgull, *Hot Embossing: Theory and Technology of Microreplication*. William Andrew (2009). (Abstract Only) (2 pages).

\* cited by examiner

B

A

SCROLLING THIN FILM MAGNIFIER DEVICE

CROSS REFERENCE TO RELATED APPLICATIONS

This application claims priority to U.S. Provisional Application Ser. No. 61/478,212, filed on Apr. 22, 2011, which is hereby incorporated by reference in its entirety.

FIELD OF THE INVENTION

The invention relates to a device that includes a scrolling magnifier (e.g., a thin film magnifier) that is integrated into the device and can be extended (unwound) and retracted (rewound) during use. The device can be a standalone device or it can be associated with other compositions, such as pens, mechanical pencils, key chain posts, cosmetic compact cases, wallets, and tie clips. The invention further provides methods of using the scrolling thin film magnifier device to magnify printed indicia and methods of manufacturing the scrolling thin film magnifier device.

BACKGROUND OF THE INVENTION

Printed indicia are often present on various materials and may be in the form of combinations of text and graphics that generally provide information relevant to the reader. The text and graphics often need to be small and densely printed so that all the required or desired information can be included in the space provided on the material. It is not uncommon for such information to be difficult to read without optical aids such as eyeglasses or magnifying glasses.

As they age, people generally experience increased difficulty in reading small print or reading print in dim lighting. Although optical aids such as eyeglasses and other types of magnifying glasses are available and can compensate for deficiencies in sight, they are easily misplaced, lost, broken, or are often not conveniently at hand when needed. While the difficulties of reading small print is prevalent on certain materials, such as receipts, paper documents, and labels and other packaging components, it is especially problematic for medicines, which are often packaged in small containers that require substantial amounts of information including: instructions for use, warnings, contraindications, and ingredient lists. In addition, the disproportionate use of medications by elderly consumers, and other consumers with impaired vision, exacerbates the problem.

The difficulty in reading small print on certain materials, such as labels, papers, packaging components, receipts, menus, maps, magazines, and books is well recognized and has led practitioners in the art to develop various types of devices to aid the consumer. For example, U.S. Pat. Nos. 6,113,295 and 7,448,817 describe magnifiers that are incorporated into a writing instrument and that provide a relatively small magnification area. Yet the devices described in both of these patents are impractical for magnifying large areas of small print.

Thus, there remains a very significant and growing need for a simple, inexpensive, and widely applicable magnifier system that can be readily associated with or integrated into a composition in order to provide a large surface, thin film magnifier as an optical aid for reading printed indicia.

SUMMARY OF THE INVENTION

In a first aspect, the invention features a device (e.g., a writing instrument, a checkbook, a journal, a map, a tablet, a wallet, a tie clip, a zipper pull (e.g., a zipper pull for jackets and on backpacks), a book, a magazine, a product information sheet, advertising literature, promotional literature, a menu, an appliance, an electrical device, or a container) that is or that includes a scrolling magnifying device having a central spool with first and second ends, a scroll that includes a lens (e.g., a Fresnel lens or a micro-lens, such as, e.g., a single lens or an array of lenses) for magnifying indicia, and, optionally printed matter, and having first and second ends being wound onto the spool, in which the second end of the scroll is fixedly attached to the spool and the first end of the scroll includes a tab that allows the scroll to be extended from the spool by pulling thereon, in which the scroll is wound onto the spool in a first position and is unwound from the spool in a second position, and a mechanism (e.g., a spring or a winch) disposed on the first and/or second ends of the spool such that the scroll can be rewound to the first position after being extended to the second position. In other embodiments, the device may further include a central spindle having a first end that is oriented toward the first end of the spool and a second end that is disposed within a through bore of the spool, in which the spool is rotatably disposed on the spindle; and/or an elongated housing having first and second opposing ends and a longitudinal slit disposed in the wall of the housing, in which: i) the central spool is disposed in the housing and the first end of the spool is oriented toward the first end of the housing; and ii) the first end of the scroll passes through the longitudinal slit of the housing, in which the tab prevents the first end of the scroll from returning through the longitudinal slit into the housing; and/or a locking mechanism, whereby the scroll can be locked in the second position and then released from the second position to return to the first position; and/or a light source (e.g., a fixed or flexible light source). In yet other embodiments, the mechanism (e.g., a spring) may be present at one or both ends of the spool; and/or the mechanism (e.g., a spring) is disposed within the through bore of the spool. In still other embodiments, the scroll is or includes a plastic material (e.g., polyurethane, vinyl (e.g., polyvinylchloride (PVC)), acrylic (e.g., poly(methyl methacrylate) (PMMA)), polystyrene, polyethylene (e.g., polyethylene terephthalate (PET)), and/or polycarbonate. In other embodiments, the lens and/or the scroll have the same or different thicknesses. In yet other embodiments, the lens and/or scroll have a thickness of less than 5.0 millimeter (mm) (e.g., a thickness of 0.6 mm or less, 0.5 mm or less, 0.4 mm or less, 0.2 mm or less, or 0.05 mm or less (e.g., across the entire surface of the lens and/or scroll, across a region or portion of the lens and/or scroll, or in a shape within the lens or scroll) or, e.g., a thickness in the range of about 0.025 mm to about 1.0 mm, such as a thickness in the range of about 0.025 mm to about 0.1 mm or about 0.05 mm to about 0.1 mm (e.g., across the entire surface of the lens and/or scroll, across a region or portion of the lens and/or scroll, or in a shape within the lens or scroll)). In yet other embodiments, the lens has a magnifying strength in the range of about 1.2× to about 20× (e.g., about 2× to about 10×, such as about 5×); and/or the lens has a groove pitch in the range of about 0.1 mm to about 1.0 mm (e.g., the groove pitch of the lens is about 0.2 mm, 0.3 mm, 0.4 mm, or 0.5 mm); and/or the lens has a focal length in the range of about 5 mm to about 115 cm (e.g., a focal length in the range of about 10 mm to about 80 mm); and/or the lens has a groove pitch of about 0.2 mm and a focal length in the range of about 100 mm to about 115 cm, a groove pitch of about 0.3 mm and a focal length in the range of about 30 mm to about 900 mm, or a groove pitch of about 0.5 mm and a focal length in the range of about 50 mm to about 900 mm. In still other embodiments, the scroll has a length of about 2 mm to 500 mm and a width of about 2 mm to about 500 mm; and/or the lens has a Shore hardness of about D20 to about D80; and/or the lens has a flexural modulus in the range of about $50 \times 10^3$ to about $600 \times 10^3$ pounds per square inch (PSI); and/or the lens has a tensile modulus in the range of about $50 \times 10^3$ to about $700 \times 10^3$ PSI. In another embodiment, the lens is capable of magnifying the indicia when placed at a distance of about 5 mm to about 70 mm from the indicia. In another embodiment, magnification of the indicia occurs by completely or partially extending the scroll to the second position. In still other embodiments, the scroll includes two or more layers. In other embodiments, the device can be connected to a composition using, e.g., a keychain or and attachment ring with a quick release. In still other embodiments, the pull tab can include a hinged ring.

A second aspect of the invention features an apparatus that includes the device of the first aspect of the invention.

A third aspect of the invention features a method of manufacturing the device of the first and/or second aspects of the invention. The method includes preparing a master mold for the scrolling lens layer using, e.g., precision diamond machining (e.g., diamond turning, such as single point diamond turning or included angle diamond turning (InADiT)). Once the master mold is prepared, the method may include casting the lens layer using a polymeric material (e.g., polyurethane, vinyl, acrylic, polystyrene, polyethylene, or polycarbonate or a high refractive index UV curable polymer). The method further includes producing a lens layer having a thickness of about 0.6 mm or less (e.g., about 0.5 mm, 0.4 mm, 0.2 mm, or 0.05 mm or less, or a thickness in the range of about 0.025 mm to about 1.0 mm (e.g., about 0.025 mm to about 0.1 mm or about 0.05 mm to about 0.1 mm)); and/or a magnifying strength in the range of about 1.2× to about 20× (e.g., about 2× to about 10× (e.g., about 5×)); and/or a groove pitch in the range of about 0.1 mm to about 1.0 mm (e.g., about 0.2 mm, 0.3 mm, 0.4 mm, or 0.5 mm); and/or a focal length in the range of about 5 mm to about 115 cm (e.g., about 10 mm to about 80 mm). In other embodiments, the method includes producing a lens layer having a groove pitch of about 0.2 mm and a focal length in the range of about 100 mm to about 115 cm; a groove pitch of about 0.3 mm and a focal length in the range of about 30 mm to about 900 mm; or a groove pitch of about 0.5 mm and a focal length in the range of about 50 mm to about 900 mm. In other embodiments of the third aspect of the invention, the method includes producing a scrolling magnifying device that includes one or more layers in the scroll. In other embodiments, the one or more layers includes an adhesive material, which may be applied during the manufacturing process. The pull tab may be present on one or more of the layers of the lens layer and may further include an optional pull ring. The pull tab may also be configured for grasping or holding (e.g., the pull tab may be configured to allow a user to grasp or hold one or more of the scrolling layers, e.g., the lens layer). In yet other embodiments, the method includes the manufacture of one or more layers of the device, including the lens layer, having a length of about 2 mm to 500 mm (e.g., a length of about 12 mm, 20 mm, 30 mm, 40 mm, 50 mm, 100 mm, or 200 mm or more) and a width of about 2 mm to about 500 mm (e.g., a width of about 12 mm, 20 mm, 30 mm, 40 mm, 50 mm, 100 mm, or 200 mm or more). In other embodiments, the lens layer, or one or more of the other layers of the scrolling magnifying device, may have the same or different dimensions. In still other embodiments, the lens layer may be manufactured to have a Shore hardness of about D20 to about D80; and/or a flexural modulus in the range of about $50 \times 10^3$ to about $600 \times 10^3$ pounds per square inch (PSI); and/or a tensile modulus in the range of about $50 \times 10^3$ to about $700 \times 10^3$ PSI. In yet other embodiments, the lens layer manufactured according to the methods of the invention is capable of magnifying printed indicia when placed at a distance of about 5 mm to about 70 mm from the indicia. Magnification of the printed indicia may occur by completely or partially extending the lens layer from the spool.

In an embodiment of all aspects of the invention, the lens is a Fresnel lens or micro-lens (e.g., an array that includes two or more Fresnel lenses or micro-lenses). The invention features a novel scrolling magnification device design that integrates into its construction a thin film magnifier element. The device provides a convenient, low cost, highly adaptable, self-contained magnifier system that can be provided in a widespread manner to the consumer as an inherent component of any product, item, or packaging that carries the device. The thin film magnifier integrated into the device of the present invention can be used as an optical aid for viewing any printed information including information on a label or on any other component.

The present invention also features a novel magnifying device obtained by integrating a low cost magnifying element onto a spool construction. The single or multi-layered device with its magnifying lens layer can be provided as a stand-alone device or readily associated with a wide variety of existing consumer products, in a widespread manner, at low cost and with low impact to current manufacturing processes. The present invention can be produced in many variations of shape, size, and construction, and associated with an unlimited variety of items and will provide benefit to the mass consumer market.

DEFINITIONS

As used herein, the term "about" means±10% of the recited value.

Other features and advantages of the invention will be apparent from the drawings, the following detailed description, and from the claims.

BRIEF DESCRIPTION OF THE DRAWINGS

FIG. 1A shows the scrolling magnifying device with the integrated magnifying lens layer in its extended position. The magnifying lens layer is also shown with a magnifying portion and a non-magnifying portion, although in other embodiments the magnifying lens portion may include the entire layer or it may have different dimensions (e.g., different lengths, widths, or shapes within the lens layer. The magnifying portion of the lens layer magnifies printed indicia (e.g., text) when it is held at a distance from the printed indicia (as shown). FIG. 1B shows the scrolling magnifying device with the integrated magnifying lens layer in its retracted position.

FIG. 9A shows the integrated magnifying lens in its retracted position. Tab (22) is also shown. FIG. 9B shows the pen embodiment of FIG. 9A that further includes a hinged ring pull attached to tab (22).

FIG. 11A shows the light source in a retraced position. FIG. 11B shows the light source in an extended position.

FIG. 12A shows the integrated magnifying lens layer (20) in its retracted position. FIG. 12B shows the integrated magnifying lens layer (20) in its extended position.

DETAILED DESCRIPTION OF THE INVENTION

Figure 1:
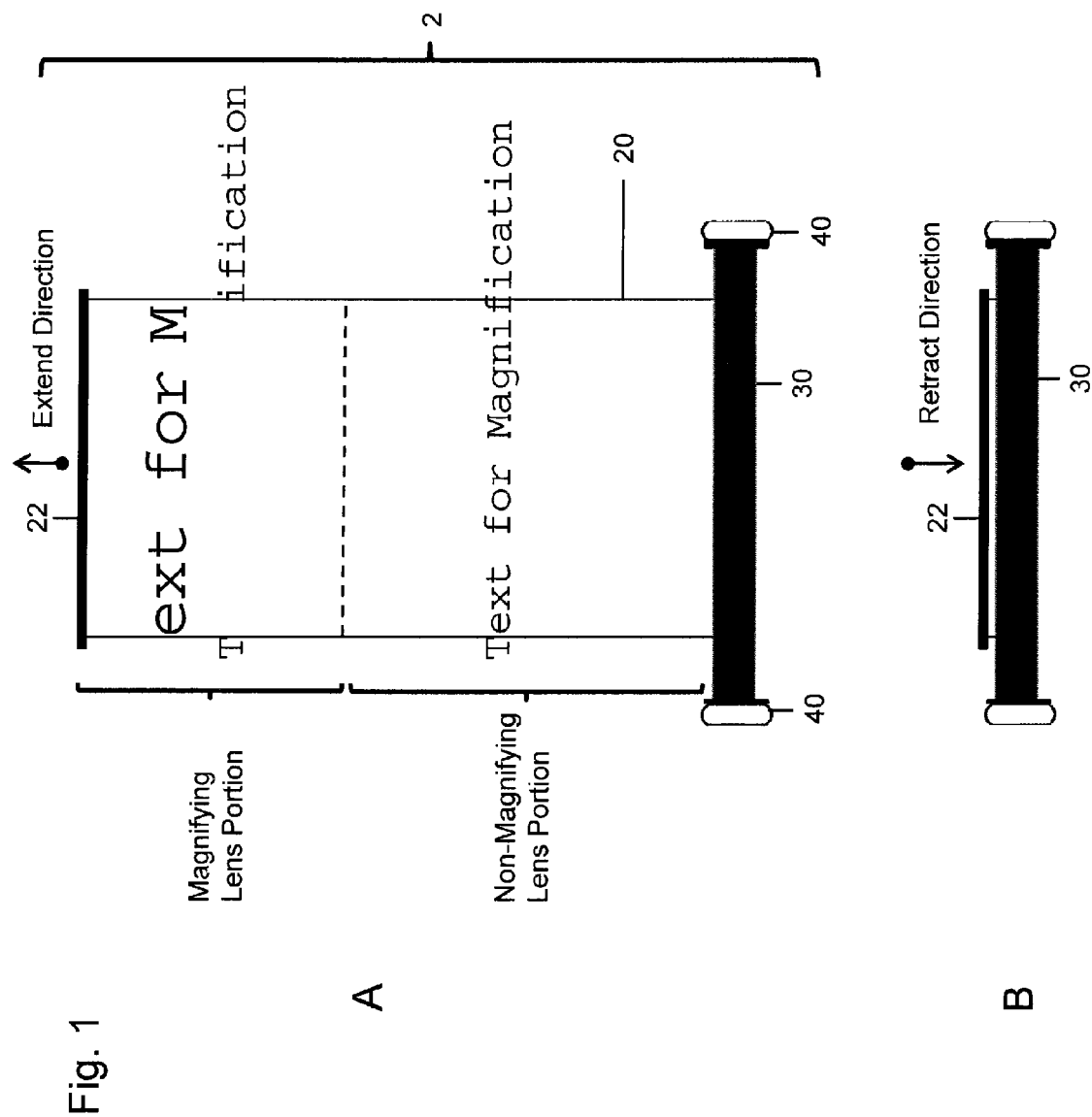
FIGS. 1A and 1B are top perspective views of the scrolling magnifying device of the invention.

The invention features a device that includes a scrolling magnifier (e.g., a thin film magnifier) that is integrated into the device and can be extended (unwound) from the spool in order to magnify printed indicia and retracted (rewound) onto the spool after use. The device can be a standalone device or it can be associated with other compositions, such as pens, mechanical pencils, key chain posts, cosmetic compact cases, wallets, tie clips, and as a zipper pull (e.g., a zipper pull for jackets and on backpacks). The device can be connected to any of these compositions using, e.g., a keychain or and attachment ring with a quick release.

The invention also features methods of using the scrolling thin film magnifier device to magnify printed indicia and methods of manufacturing the scrolling thin film magnifier device.

In particular, the magnifier of the device is a thin film layer (e.g., a scroll) that is affixed to the spool at one of its ends. The other end of the thin film layer may include a tab that can be grasped by a user in order to exert force necessary to unwind the magnifying layer from the spool into its extended state. Various types of pull tabs can be employed to make it easier to grasp the tab and extend the scrolling magnifier lens. For example, a hinged ring could be employed that is easy to grasp and that can fold back against the side of the scrolling thin film magnifier device when not being used. This ring can be positioned along the central portion of the tab strip.

The scrolling magnifier device may also include multiple thin film layers in addition to the magnifying lens layer. The device can be constructed, for example, such that the magnifying lens layer can be peeled back from the surface of the other layers and either partially or totally removed from the remaining layers during use. Once use of the lens layer is complete, it may be re-adhered to the other layers of the device using, e.g., an adhesive material (e.g., a pressure sensitive adhesive material) that is incorporated into one or more of the layers.

Once the magnifying lens layer is extended from the device or, if it is present in a device having one or more additional layers, peeled back from, unfolded, or removed from the other layer(s) of the device, it can be positioned at a suitable distance according to the focal length of the lens such that the print or object to be observed appears focused and magnified. To those skilled in the art of making adhesive layers, there are many different types of adhesives and release coatings commonly used to facilitate the construction of a sheet having multiple layers in which one or more of the layers can be peeled back and partially or totally removed and re-adhered multiple times (see, e.g., Cray, "Silicone Release Coatings for the Pressure Sensitive Adhesive Industry," Chapter 9, "Silicones in Industrial Applications" in *Inorganic Polymers*, Nova Science Publishers; ed. Roger De Jaeger and Mario Gleria, 2007).

The scrolling magnifier device may also include a compact light source that provides illumination of printed indicia during use of the device. Examples of lighting systems that can be integrated into the scrolling magnifying device can be found in, e.g., U.S. Pat. Nos. 7,139,136; 5,754,349; 5,388,038; and 6,000,809; each of which is incorporated by reference herein. Preferably, the light source provides even and uniform illumination of the viewing area or along the entire dimension of the magnifying lens layer. In several embodiments, the scrolling magnifier device includes a switch that allows the user to actuate the light source or the light source can be switched on and off automatically through the action of extending and retracting, respectively, the magnifying film from the spool. In other embodiments, the light source is powered electrically, e.g., by a battery, or it may be powered by a handcrank. The light source may be integrated into the scrolling magnifier device or it may be an accessory that can be affixed to the scrolling magnifier device. In yet other embodiments, the light source can be adjusted in order to provide the user with optimum illumination of the viewing area.

The scrolling magnifier device provides a convenient, low cost, highly adaptable, self-contained magnifier system that can be provided in a widespread manner to the consumer as a standalone device or as an inherent component of any product or item. In particular, scrolling magnifier devices of the invention feature the use of thin film magnifier technology, such as Fresnel lens or micro-lens array technology, which enable the magnifying element to be formed into a thin transparent film suitable for integration into a layer construction for application to a scroll upon which the layer is wound.

The thin film magnifying lens or lens layer of the device may have a thickness in the range of about 25 μm to about 1.0 mm (e.g., a thickness in the range of about 30 μm to about 500 μm in thickness, preferably a thickness in the range of about 30 μm to about 200 μm (e.g., 30, 40, 50, 60, 70, 80, or 90 μm in thickness)). In another embodiment, the lens or lens layer has a thickness of 50 μm or less.

The lens or lens layer of the device may operate at focal lengths within the range of about 1 mm to about 200 mm (e.g., focal lengths in the range of about 5 mm to about 100 mm, about 5 mm to about 40 mm, or about 10 mm to about 80 mm). The magnifying lens or lens layer also provides about 1.2× to about 10× magnification (e.g., about 2× to about 5× magnification (e.g., 2×, 3×, 4×, or 5× magnification)). For example, the magnifying lens or lens layer may provide about 2× to about 3× magnification of target indicia when placed at a distance of approximately at 2.5 cm from the indicia. The magnifying lens or lens layer of the device can be manufactured using any of a variety of acceptable materials including, e.g., polyurethane, vinyl (e.g., polyvinylchloride (PVC)), acrylic (e.g., poly(methyl methacrylate) (PMMA)), polystyrene, polyethylene terephthalate (PET), polyethylene (PE; e.g., HDPE), and polycarbonate. In another embodiment, the magnifying lens or lens layer of the device is PMMA or PET. Other suitable materials may also be used.

The lens or lens layer of the scrolling magnifier device, or the device itself, may be sized and shaped according to the needs of the user or the size and/or shape of the composition to which the device may be affixed or with which the device is integrated. In other embodiments, the lens or lens layer of the device may be about 2 mm to about 500 mm wide and about 2 mm to about 500 mm long (e.g., 52 mm×82 mm; 60 mm×60 mm; 65 mm×190 mm; 95 mm×135 mm; 180 mm×260 mm; 190 mm×300 mm; 225 mm×160 mm; 260 mm×260 mm; 395 mm×395 mm). In other embodiments, the magnifying lens has a different size and/or shape relative to the scrolling lens layer into which the lens is integrated (see, e.g., FIG. 1, which shows a spool that includes a scrolling layer having a magnifying lens portion and a non-magnifying lens portion). In alternative embodiments involving a scrolling magnifier device having multiple layers, including the magnifying lens layer, wrapped around the spool, the magnifying lens layer may have a different size and/or shape relative to the other layer(s). In particular, the magnifying lens layer may be wider or longer, which may allow the magnifying lens layer to be, e.g., unfolded from the multi-layered layer and used to magnify printed indicia without having to remove the magnifying lens layer from the device.

There now follows a description of particular embodiments of the invention.

Structure of the Scrolling Magnifier Device

The scrolling magnifier device of the present invention features a layer (a scroll) that includes a magnifying lens as all or a part of a layer that is wound around a spool. The layer can be extended and unwrapped from the spool to expose the magnifying lens. In several embodiments, the lens layer may include printed indicia (e.g., words, pictures, symbols, or other information). The printed indicia may include, e.g., instructions for use of a composition associated with the device, promotional or advertising information, or a variety of other types of information. One or both sides of the lens layer, or neither side, may include printed information. Alternatively, the lens layer may include only the magnifying lens. The scrolling magnifier device may also include more than one layer wrapped around spool (30). For example, the spool may include two or more layers (e.g., 3, 4, 5, or 6 or more layers) in addition to magnifying lens layer (20).

The scrolling magnifier device may also include a mechanism, such as a spring, that automatically and continuously draws the magnifying lens layer back into a wound configuration around spool (30) when the magnifying lens layer is moved from a retracted to an extended position.

Referring now to the invention in more detail, FIGS. 1A and 1B depict embodiments of a scrolling magnifier device (2) of the invention. FIG. 1A shows scrolling magnifier device (2), which includes spool (30), scrolling lens layer (20) in its extended configuration, and pull tab (22). FIG. 1A shows an optional configuration in which the lens layer is divided into two portions: a magnifying lens portion and a non-magnifying lens portion. It should be understood that this is but one embodiment of the invention and the invention should not be construed as being limited to this embodiment. For example, the magnifying lens portion of lens layer (20) can encompass the entire layer or only portions of the layer. In another example, the lens layer may include two or more magnifying lens portions that are present in various locations along a single lens layer (20). Furthermore, as discussed herein, scrolling magnifier device (2) may include two or more layers wound about spool (30), in which at least one of the layers is magnifying lens layer (20). Practitioners skilled in the art will recognize that the device can be configured with numerous other embodiments and designs. FIG. 1A also shows hubs (40) into which the ends of spool (30) are inserted. Hubs (40) allow spool (30) to rotate freely, thereby allowing lens layer (20) to wind and unwind about spool (30). Hubs (40) may include a mechanism, e.g., a spring, that provides rotational tension that retains lens layer (20) in its wound configuration about spool (30).

FIG. 1B shows scrolling magnifier device (2) in which lens layer (20) has been retracted back onto spool (30).

In still other embodiments shown in FIGS. 1A and 1B, the magnifying lens layer (20) of scrolling magnifier device (2) may be extended by pulling on tab (22) and used to magnify printed indicia, e.g., printed indicia associated with a composition to which scrolling magnifier device (2) is affixed, or printed indicia on an unrelated composition (e.g., a composition or article to which scrolling magnifier device (2) is not affixed). The magnifying lens layer portion of scrolling magnifier device (2) can be returned to its retracted position once use of the lens layer is completed.

In other embodiments, the entire lens layer may be a magnifying lens or only one or more portion of the lens layer may include a magnifying lens portion. Thus, the magnifying lens portion may have different dimensions (e.g., a lesser width, length, and/or thickness) relative to the non-magnifying lens portion of the lens layer.

Figure 2:
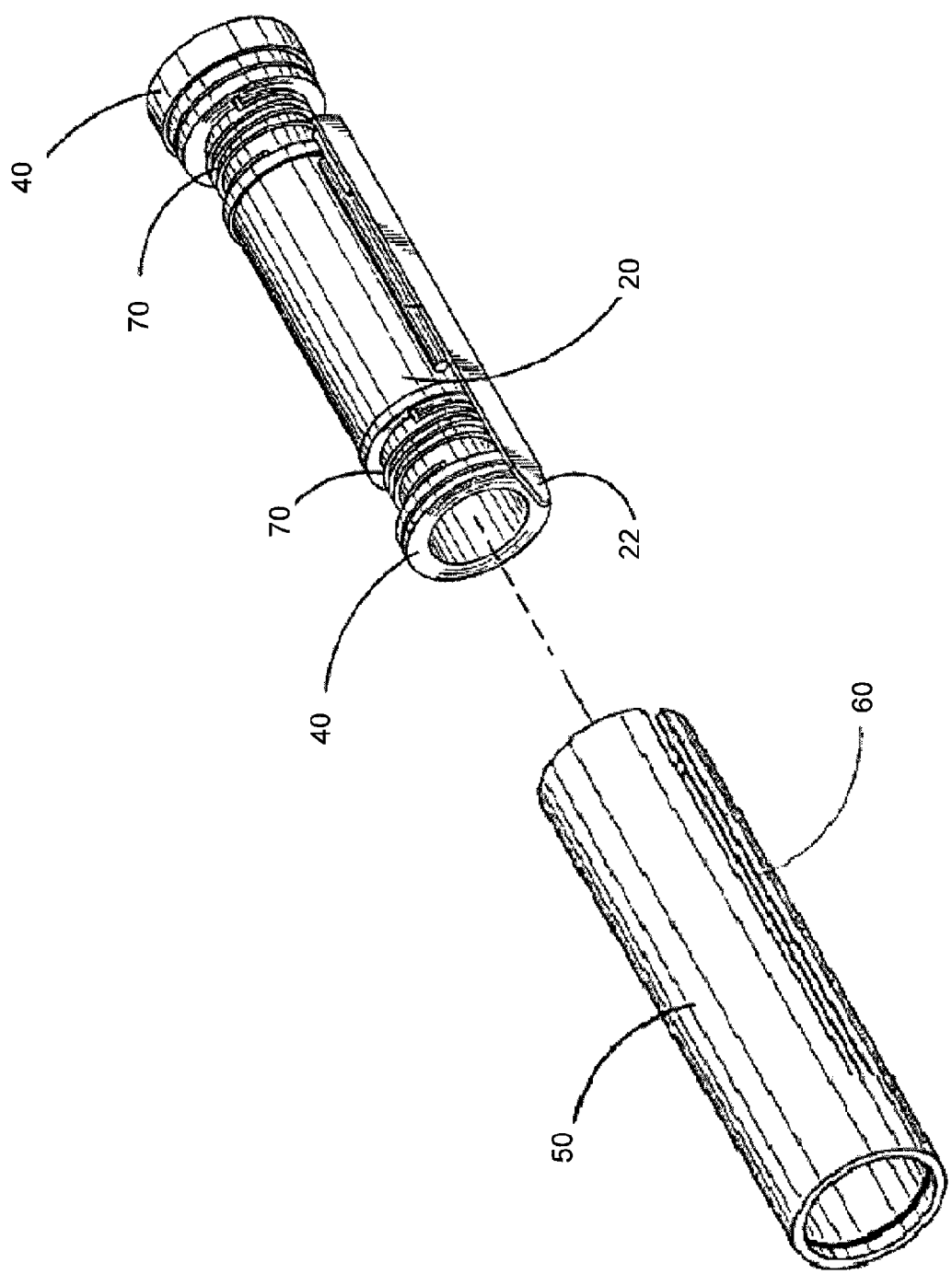
FIG. 2 is a top perspective view of the scrolling magnifying device of FIGS. 1A and 1B combined with an optional housing.
Figure 3:
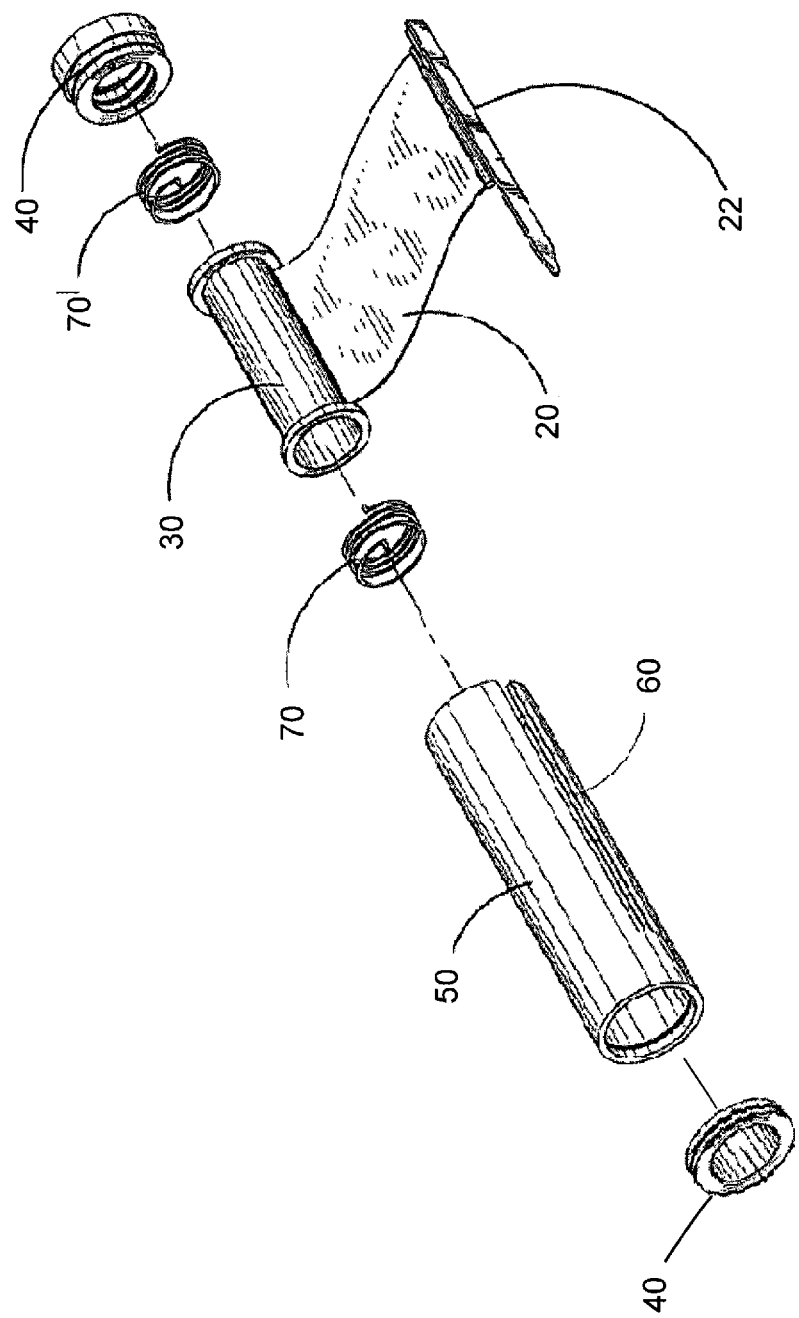
FIG. 3 is an exploded view of the scrolling magnifying device of FIG. 2.

FIG. 2 shows an exploded view of scrolling magnifier device (2) in combination with optional elongated housing (50). In this embodiment, magnifying lens layer (20) is in its retracted configuration and is wound about spool (30). Spool (30) may be combined with elongated housing (50) by inserting tab (22) through elongated slit (60). Tab (22) remains on the exterior of elongated housing (50) with tab (22) extending outside elongated housing (50) through elongated slit (60). In the embodiment shown in FIG. 2, hubs (40) include springs (70) that provide rotational tension keeping magnifying lens layer (20) in its retracted configuration. FIG. 3 shows an exploded view of the scrolling magnifier device (2) of FIG. 2.

Figure 4:
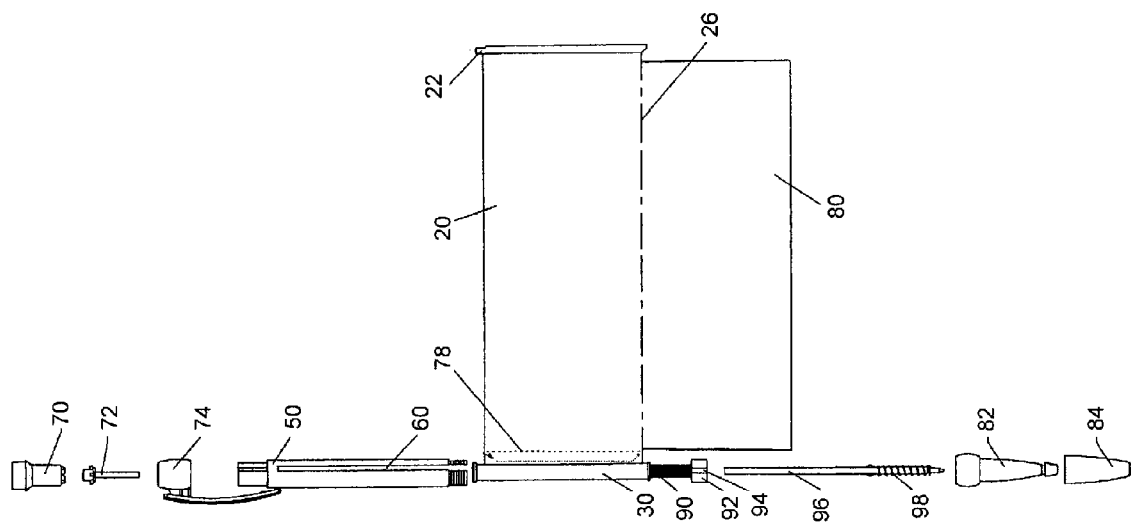
FIG. 4 is an exploded view of a pen embodiment of the scrolling magnifying device (2) showing that the magnifying lens layer, once extended, may be unfolded along line (26) to an expanded configuration that provides a larger area of magnification.

FIG. 4 shows an embodiment of the invention in which magnifying lens layer (20) is folded (80) upon itself along fold line (26). In this embodiment, magnifying lens layer (20) can be extended to at least twice its size (while the pulled out length of magnifying lens layer (20) remains unchanged) by unfolding the layer once it is extended from spool (30). Also shown is top button (70), a turning shaft (72) with a geared top, and a cap ring (74) with an integral clip, all of which is similar to a conventional ball pen. Elongated housing (50) includes slit (60) through which magnifying lens layer (20) and pull tab (22) protrude once spool (30) is inserted into elongated housing (50). Also shown is base cap (82) and silicon grip (84). A centre tube spring (90) is shown with a locking nipple (92), both of which provide spring tension to spool (30). Groove (94) on locking nipple (92) enhances spring tension. Pen (96) and pen spring (98) are also shown. Pen (96), having a central spindle, is disposed within a through bore within spool (30). Locking flap (78) provides a mechanism for maintaining magnifying lens layer (20) in an extended configuration.

Figure 5:
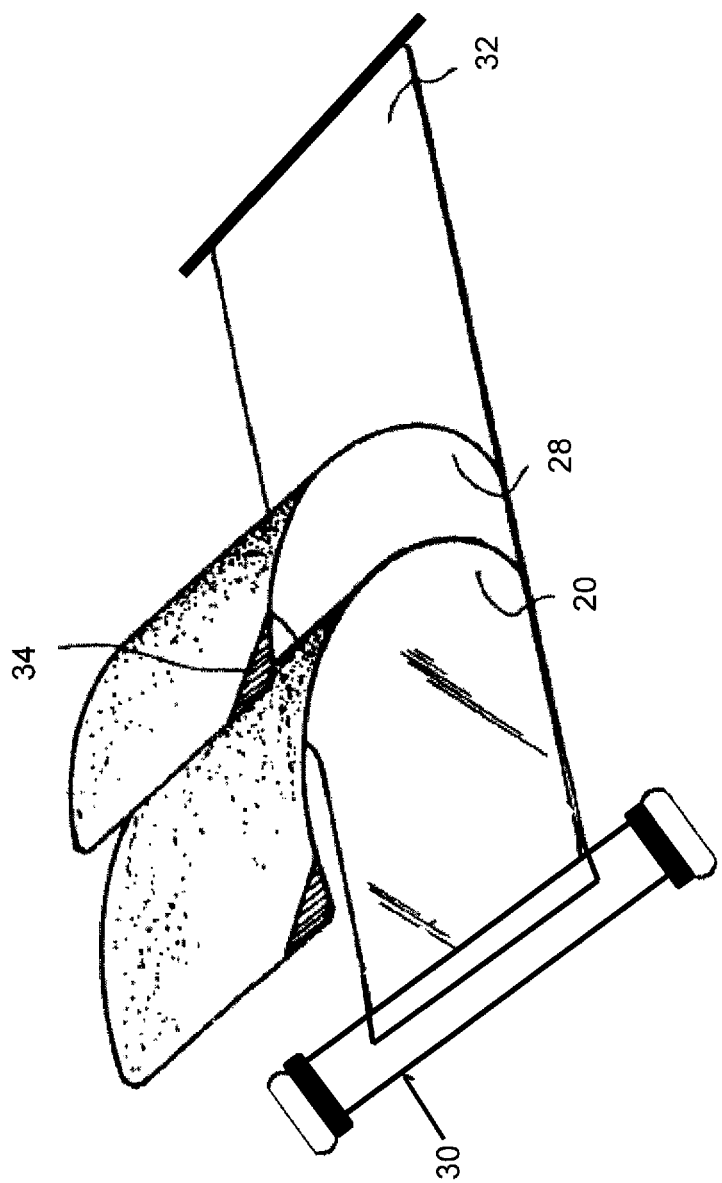
FIG. 5 is a perspective view of a multi-layered scrolling magnifier device of the invention.
Figure 6:
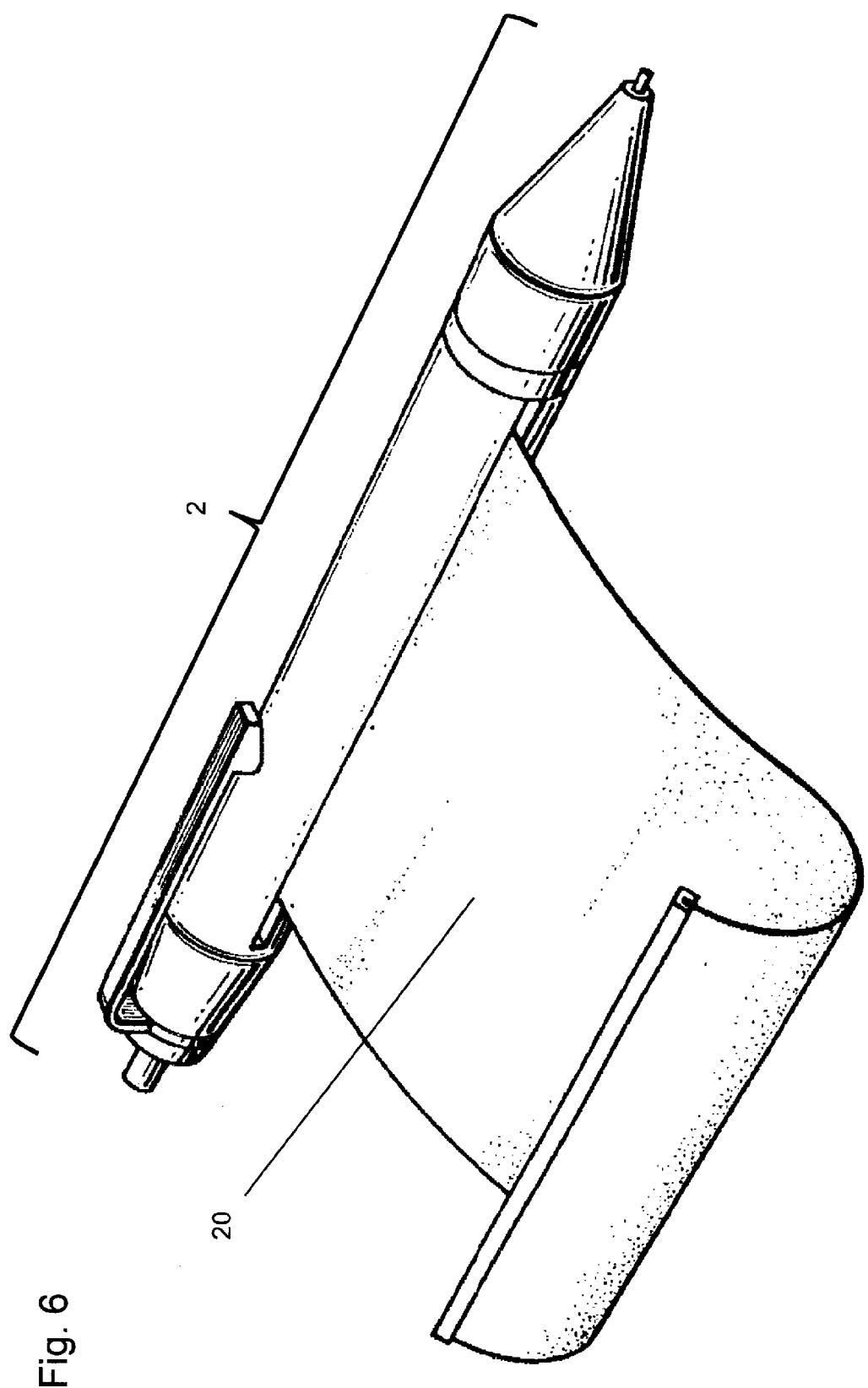
FIG. 6 is a top perspective view of a pen embodiment of the scrolling magnifying device (2) of the invention with an integrated magnifying lens layer (20) in its extended position.
Figure 7:
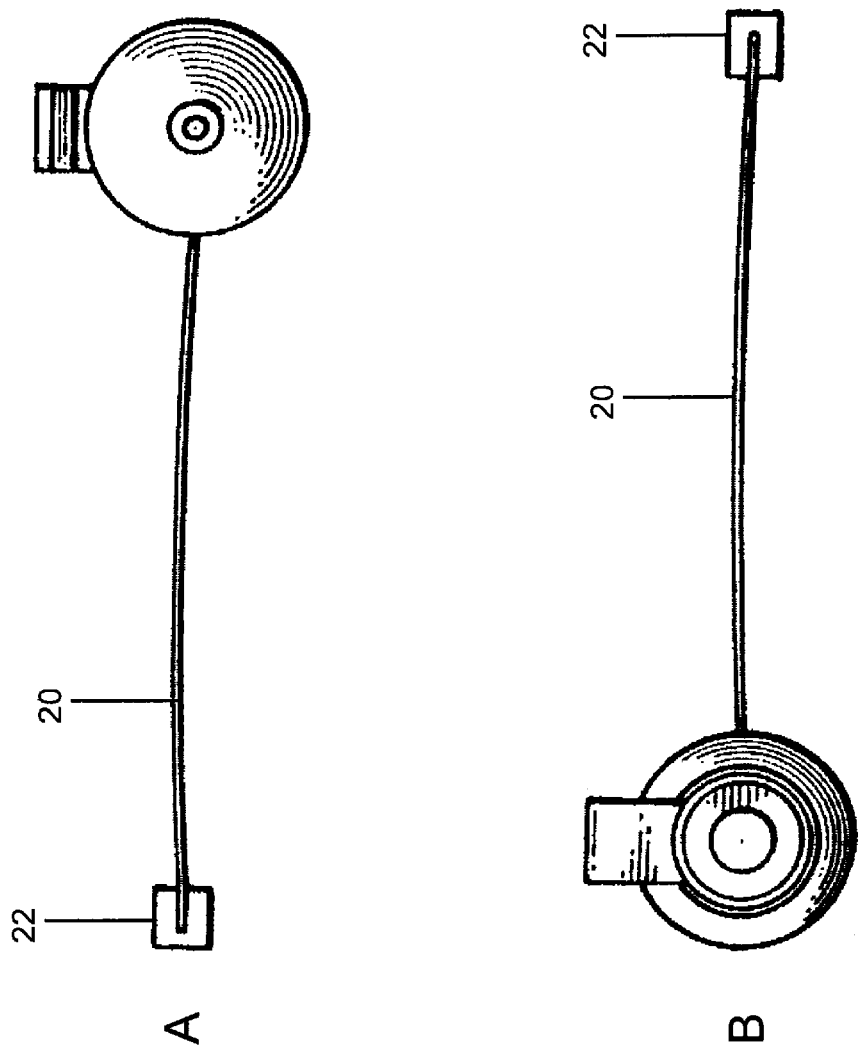
FIGS. 7A and 7B are side views of pen embodiments of the scrolling magnifying device showing an integrated magnifying lens layer (20) in its extended position. Also shown is tab (22).
Figure 8:
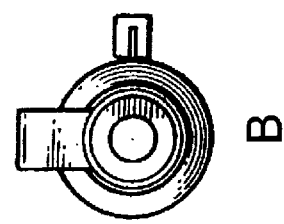
FIGS. 8A and 8B are side views of the pen embodiments of FIGS. 7A and 7B, respectively, showing the integrated magnifying lens layer in its retracted position.
Figure 8:
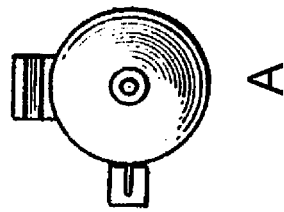
Figure 9:
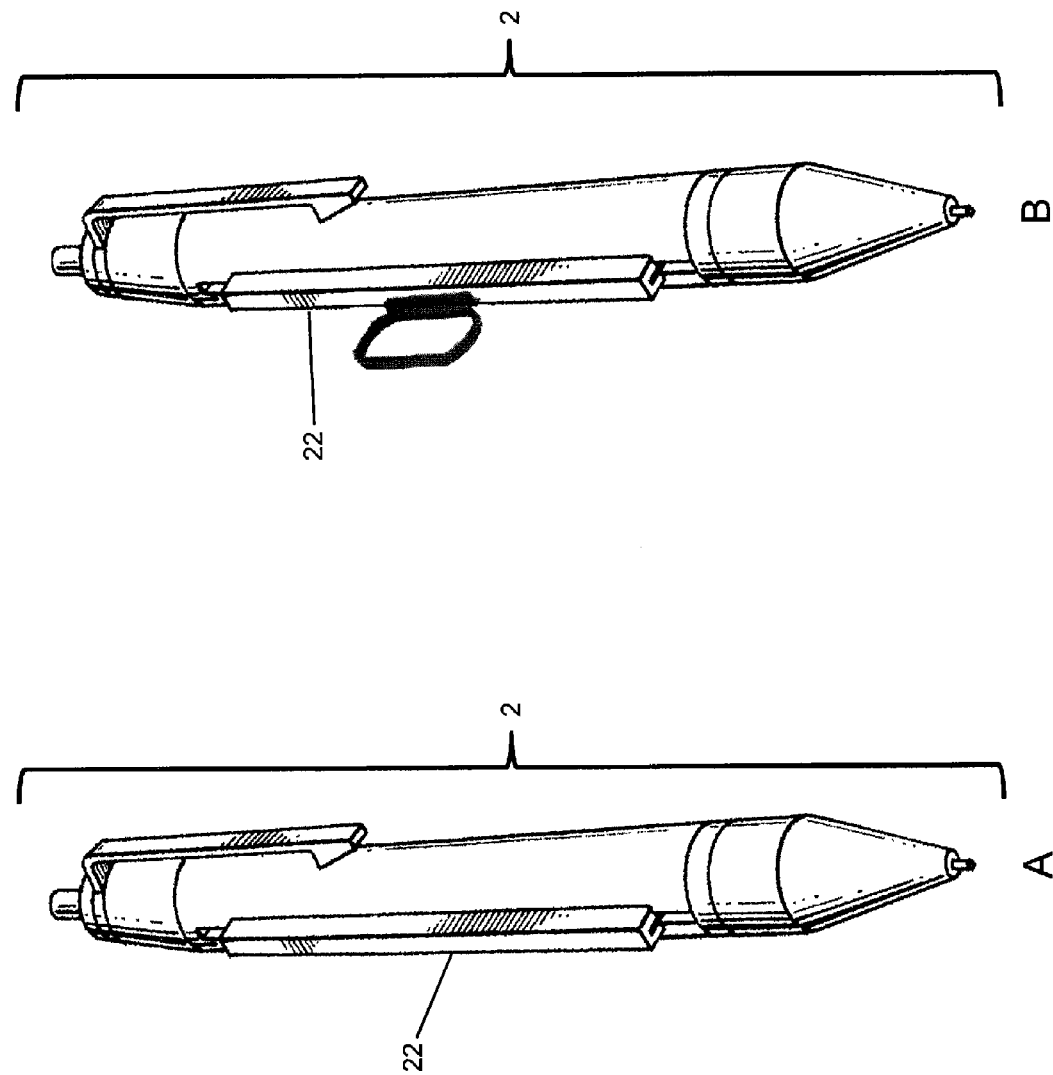
FIGS. 9A and 9B are top perspective views of pen embodiments of the scrolling magnifying device (2).

FIG. 5 shows an embodiment of the invention in which scrolling magnifier device (2) includes more than one layer. In FIG. 5, scrolling magnifier device (2) includes three layers, in which the top layer is magnifying lens layer (20). Middle layer (28) and/or bottom layer (32) may also include a magnifying lens. Alternatively, middle layer (28) and/or bottom layer (32) may include printed indicia or other information or they may be blank. Although described above in a particular order above, magnifying lens layer (20) may be positioned as any one of the layers (e.g., as a middle or a bottom layer) in a multi-layer device. The layers included in scrolling magnifier device (2) may include lift tab (34) that allows the layers to be easily separated from each other. One or more of the layers may also include a perforation near spool (30) that allows them to be separated from scrolling magnifier device (2) by tearing along the perforation.

For devices of the invention that include two or more layers wound about spool (30), each layer may be attached to spool (30), or one or more of the layers may be affixed to a single layer by an adhesive material that allows the layer(s) to be repeatedly separated from the other layer(s), and re-adhered. A preferred adhesive is a PSA. Other adhesive materials are described below. In this embodiment, the plurality of layers of the scrolling magnifier device (2) may be laminated to, but capable of complete, but resealable, separation from, each other. Alternatively, one or more of the layers may be permanently laminated at one end (e.g., at a hinge region) to form a booklet. In this alternative embodiment, a more permanent bond forms between one or more of the layers at the hinge region, which lies closest to the attachment point at spool (30), that prevents one or more of the layers from being completely separated from each other or from the scrolling magnifier device (2). It should be appreciated that the word "permanent," as used herein, is a relative term. The "permanent" bond formed at the hinge region is a relatively permanent bond compared to the releasable bond that may be formed by an adhesive material between one or more of the layers of the scrolling magnifier device (2). It is, of course, to be understood that the layers affixed at the hinge region may likely be completely separable from one another upon the application of a sufficiently great separation force. Yet, under these circumstances, one or more of the layers would, in all likelihood, be of no further use. In another embodiment, the layers of the scrolling magnifier device (2), including magnifying lens layer (20), may include a perforation adjacent to the hinge region that allows for detachment of one or more of the layer(s), including, e.g., magnifying lens layer (20).

FIGS. 6-9 show pen embodiments of scrolling magnifier device (2).

Figure 10:
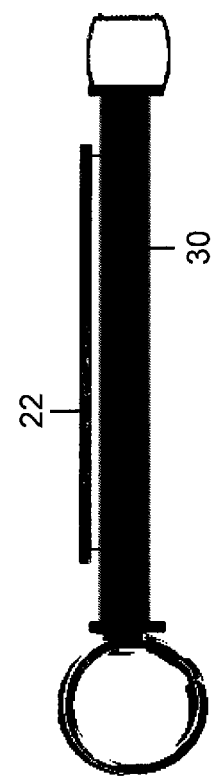
FIG. 10 is a perspective view of a scrolling magnifying device having a keychain attachment.

FIG. 10 shows an embodiment in which scrolling magnifier device (2) includes a keychain.

Figure 11:
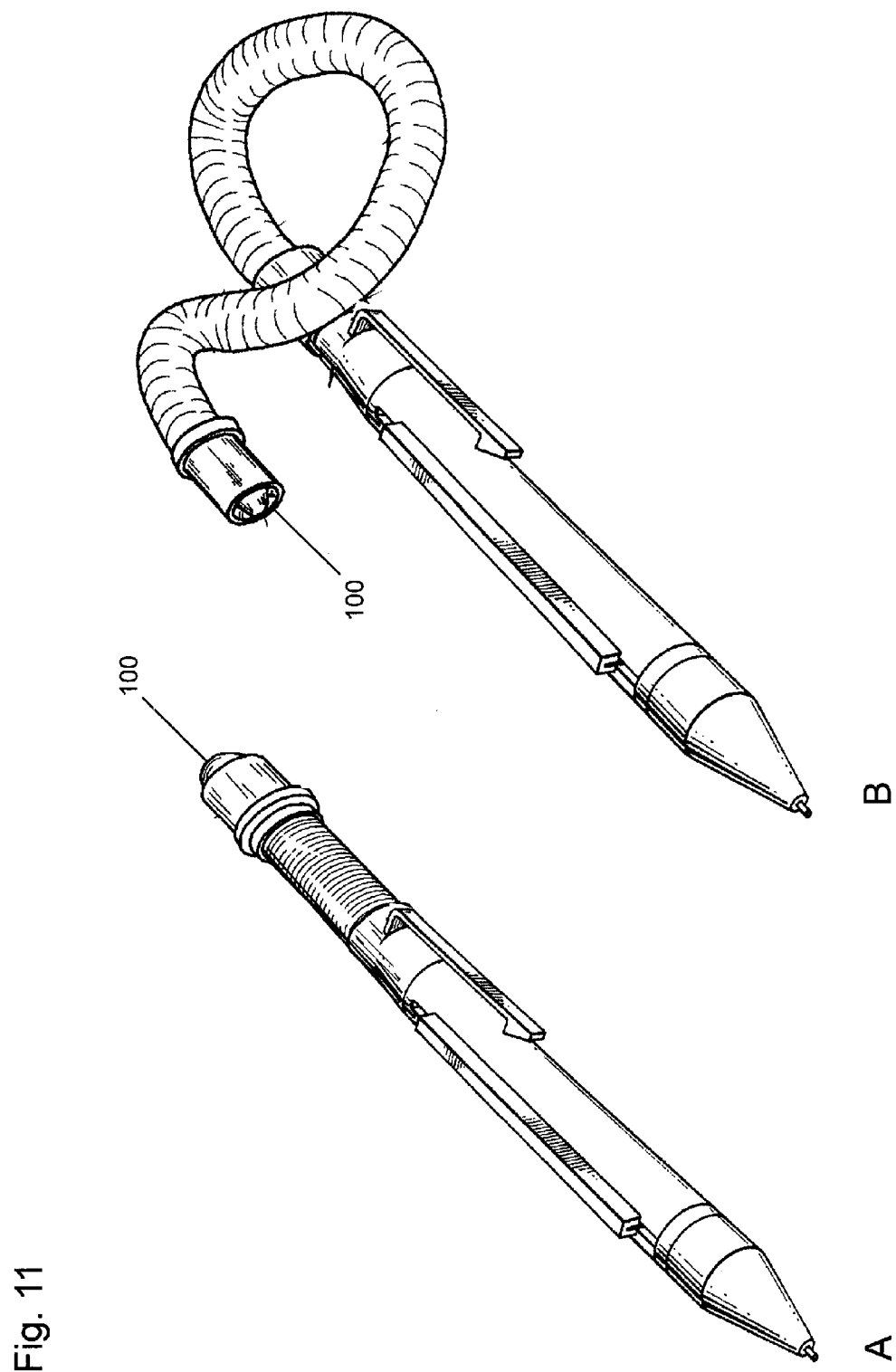
FIGS. 11A and 11B are top perspective views of pen embodiments of the scrolling magnifying device (2) that also includes an adjustable light source (100).

FIGS. 11A and 11B show pen embodiments of the invention that include scrolling magnifier device (2) and light source (100) that can be extended and retracted.

Figure 12:
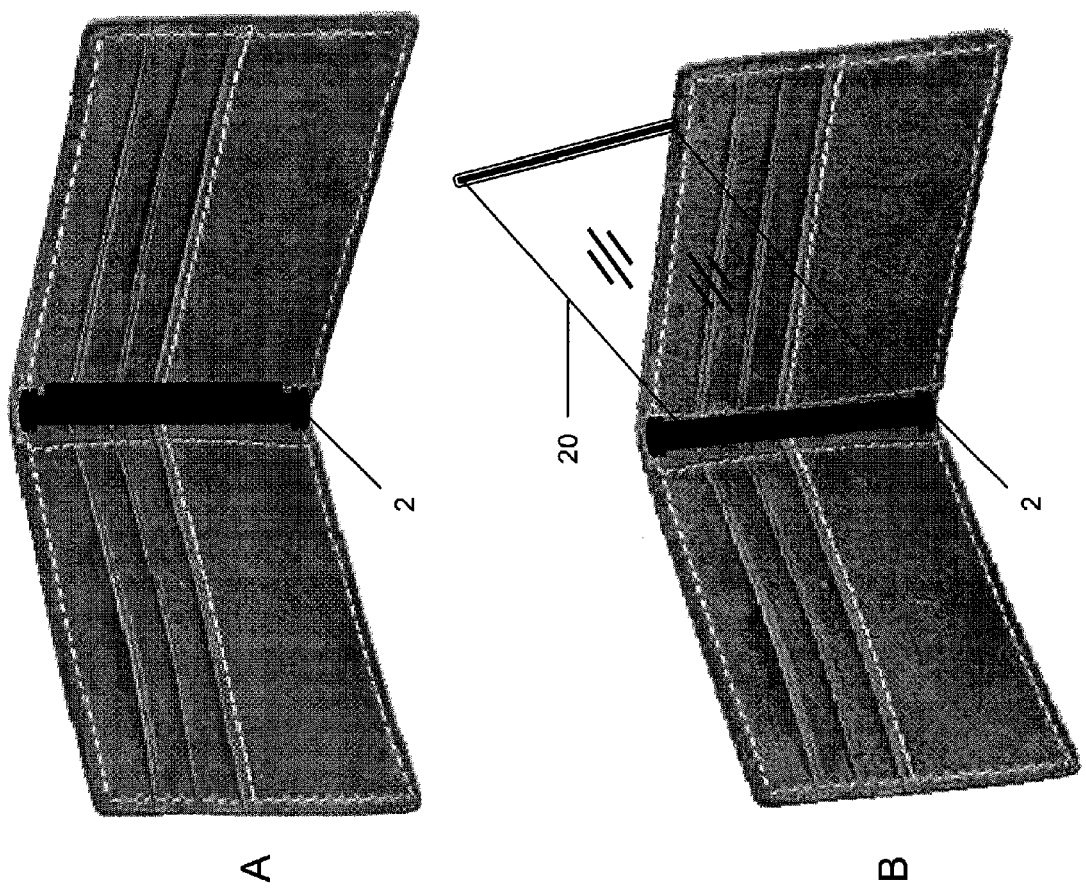
FIGS. 12A and 12B are top perspective view of wallet embodiments of the scrolling magnifying device (2) of the invention.

FIGS. 12A and 12B show an embodiment of the invention in which scrolling magnifier device (2) is incorporated into a wallet. FIG. 12A shows magnifying lens layer (20) in its retracted state, while FIG. 12B shows magnifying lens layer (20) in its extended state.

In any of the embodiments described herein, scrolling magnifier device (2) may include a mechanism for stopping or locking magnifying lens layer (20) in an extended or retracted position. The mechanism may be a pin, a gear, a flap, or other structure known in the art that can be engaged by the user, e.g., to prevent retraction (e.g., rewinding) of magnifying lens layer (20) onto spool (30) during use, and subsequently disengaged by the user once the use is complete. The mechanism may be configured so that it can be manually engaged and disengaged (e.g., by pulling the pin, engaging the gear, or dislodging the flap, or by giving magnifying lens layer (20) a slight tug to disengage the pin, gear, or flap, or to reengage a mechanism, such as a spring, that results in rewinding of lens layer (20) onto spool (30)). The mechanism for stopping or locking scrolling magnifier device in an extended or retracted position may also be configured so that it can be mechanically engaged and disengaged (e.g., by a motor or other battery- or electric-powered mechanism). Examples of mechanisms for stopping or locking magnifying lens layer (20) can be found in, e.g., U.S. Patent Application Publication No. 2009/080965 and U.S. Pat. No. 7,839,035, both of which are incorporated by reference in their entirety.

Figure 13:
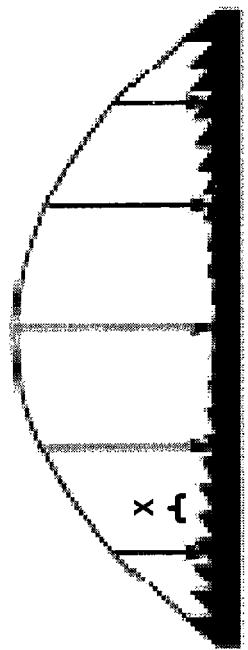
FIG. 13 is a cross-sectional view of the surface of a Fresnel lens. The area designated by the X is the distance signifying the groove pitch of the lens.

Magnifying lens layer (20) of scrolling magnifier device (2) may have a thickness in the range of about 25 µm to about 5 mm (e.g., a thickness in the range of about 25 µm to about 2 mm, more preferably a thickness in the range of about 25 µm to about 200 µm (e.g., 60, 70, 80, or 90 µm in thickness). In other embodiments, magnifying lens layer (20) features the use of thin film magnifier technology, such as Fresnel lens or micro-lens array technology, which allows the magnifying lens layer to be formed into a thin transparent film (e.g., having a thickness of, e.g., about 400 µm or less (e.g., about 25 µm, 50 µm, 100 µm, or 200 µm) suitable for integration into a thin film layer construction. In an embodiment, the thin film magnifying element has a thickness of about 50 µm or less. An example of a cross-section of a Fresnel lens is shown in FIG. 13. The groove pitch is the distance between two peaks (shown as X in FIG. 13). A magnifying lens layer based on Fresnel lens technology can be made using multiple different focal lengths and with a wide range of different groove pitches (e.g., in the range of about 0.2 mm to 0.5 mm).

Materials for the Scrolling Magnifier Device

The magnifying lens layer, or, if present, other layers, of the scrolling magnifier device may be made using a plastic material. For example, the plastic material may be polyurethane, vinyl (e.g., polyvinylchloride (PVC)), acrylic (e.g., poly(methyl methacrylate) (PMMA)), polystyrene, polyethylene terephthalate (PET), polyethylene (e.g., HDPE), or polycarbonate). Other materials may also be used to manufacture the magnifying or non-magnifying lens portions of the lens layer of the scrolling magnifier device.

The magnifying lens portion of the lens layer features the use of thin film magnifier technology, such as Fresnel lens (see, e.g., Davis et al., Optik & Photonik, 2007; Miller et al., J. Opt. Soc. Am. 41:807-814, 1951) or micro-lens array technology (see, e.g., Ren et al., Optics Commun. 261:296-299, 2006; Jahns and Walker, Applied Optics 29:931, 1990), which allow the magnifying element to be formed into a thin transparent film suitable for integration into a thin film layer construction. Other portions of the lens layer, such as the non-magnifying lens portion of the lens layer, may be made from paper or other materials (e.g., the paper material may be coated with a plastic material to protect it from damage).

The magnifying lens portion of the lens layer (or the entire magnifying lens layer), or one or more other layers of the device, may have a thickness of less than 5.0 millimeters (mm). For example, the magnifying lens material (or the entire magnifying lens layer), or one or more other layers, may have a thickness in the range of about 0.025 mm to about 1.0 mm (e.g., a thickness in the range of about 0.025 mm to about 0.6 mm (e.g., about 0.5 mm, 0.4 mm, 0.3 mm, or 0.2 mm in thickness) or a thickness in the range of about 0.025 mm to about 0.2 mm). In several embodiments, the magnifying lens portion (or the entire magnifying lens layer), or one or more other layers, has a thickness of about 50 µm to about 100 µm (e.g., a thickness of about 30, 40, 50, 60, 70, 80, or 90 µm).

The magnifying lens of the lens layer may have a magnifying strength in the range of about 1.2× to about 20× (e.g., a magnifying strength of about 2× to about 10× (e.g., about 5× magnifying strength)).

In other embodiments, the magnifying lens of the lens layer can operate at focal lengths within the range of about 1 mm to about 115 cm (e.g., a focal length in the range of about 1 mm to about 50 cm, about 5 mm to about 1 cm, about 5 mm to about 100 mm, or about 10 mm to about 80 mm). In other embodiments, the focal length is about 500 mm or less, preferably about 100 mm or less, and more preferably in the range of about 5 mm to about 80 mm). In addition, the magnifying lens of the lens layer may include a groove pitch in the range of about 0.1 mm to about 1.0 mm (e.g., a groove pitch of about 0.2 mm, 0.3 mm, 0.4 mm, or 0.5 mm). In several different embodiments, the magnifying lens of the lens layer may have the following specifications:

- a groove pitch of about 0.2 mm and a focal length in the range of about 100 mm to about 115 cm;
- a groove pitch of about 0.3 mm and a focal length in the range of about 30 mm to about 900 mm; or
- a groove pitch of about 0.5 mm and a focal length in the range of about 50 mm to about 900 mm.

In other embodiments, the magnifying lens of the lens layer (or the entire lens layer) has the following dimensions: a length of about 2 mm to 500 mm and a width of about 2 mm to about 500 mm. The magnifying lens layer may also be flexible (e.g., it may have a flexural modulus in the range of about $50 \times 10^3$ to about $600 \times 10^3$ pounds per square inch (PSI)). The magnifying lens layer may also exhibit a Shore hardness of about D20 to about D80. The magnifying lens layer may also have a tensile modulus in the range of about $50 \times 10^3$ to about $700 \times 10^3$ PSI.

Companies that have the capability of manufacturing Fresnel lenses that can be incorporated into the magnifying lens layer of the scrolling magnifier device of the invention include, e.g., Microsharp Corporation Limited (52 Shrivenham Hundred, Business Park, Watchfield, Oxfordshire SN6 8TY, United Kingdom) and Yunmeng Fushen Plastics Co. Ltd, Yumeng, Xiagen City, Hubei, China).

The tab of the scrolling magnifier device, as well as other elements of the scrolling magnifier device, may be made from plastic or metal. For example, the elongated housing may be made from a hard plastic material.

Adhesive Material

The scrolling magnifier device may include an adhesive material that allows one or more of the layers, if multiple layers are present in the device, to be repeatedly partially or fully separated and re-adhered to one another. For example, the interior surfaces of one or more of the layers of the device may be coated with the adhesive material.

Examples of adhesives that can be used in the construction of the layers of the device include but are not limited to a pressure sensitive adhesive (PSA), a non-reactive adhesive (e.g., a drying adhesive, such as a solvent based adhesive or a polymer dispersion or emulsion adhesive), a contact adhesive, a hot adhesive (e.g., a hot melt adhesive), a reactive adhesive (e.g., a multi-component adhesive (e.g., polyester resin+polyurethane resin; polyols+polyurethane resin; or acrylic polymers+polyurethane resins), a one-part adhesive (e.g., an adhesive curable by radiation (e.g., a UV light curing adhesive or light curing material), heat (e.g., heat curing adhesives, such as epoxies, urethanes, and polyimides), or moisture (e.g., cyanoacrylates and urethanes)), a natural adhesive (e.g., bioadhesives, such as adhesives made from vegetable matter, starch (dextrin), natural resins, or from animals (e.g., casein or animal glue)), a synthetic adhesive (e.g., elastomers, thermoplastics, emulsions, and thermosets). An aqueous composition (e.g., water) may also serve as an adhesive. Sources of these materials include Trebnick Systems (Springboro, Ohio) and Actega Wit (Cinnaminson, N.J.). The adhesive may also be an acrylic (e.g., an emulsion acrylic), a synthetic or natural rubber (e.g., butyl rubber) a hot-melt adhesive (e.g., ethylene-vinyl acetate (EVA)), a nitrile, a silicone (e.g., a silicone rubber or an ultra-violet (UV) curable silicone compound), a styrene block copolymer (SBC; e.g., styrene-butadiene-styrene (SBS), styrene-ethylene/butylene-styrene (SEBS), styrene-ethylene/propylene (SEP), or styrene-isoprene-styrene (SIS)), and a vinyl ether. Release coatings for release backing materials are generally formulated using various types of silicones including UV and thermally curable formulations. These are available from a number of sources including Actega Wit (Cinnaminson, N.J.) and General Electric Co. (Waterford, N.Y.). Pressure sensitive adhesives include but are not limited to an acrylic material, a butyl rubber, a ethylene-vinyl acetate (EVA) with high vinyl acetate content (e.g., a hot-melt PSA), a natural rubber, a nitrile, and a silicone material (e.g., silicone rubber or an ultra-violet (UV) curable silicone compound). Preferred adhesive materials allow the layer(s) to be repeatedly separated from other layers of the device and subsequently re-adhered.

Other adhesive materials include optical adhesives that are substantially free of UV-absorbing chromophores, such as extended aromatic structures or conjugated double bonds. Useful adhesives include, for example: NOA61, a UV cured thiol-ene based adhesive available from the Norland Company (Cranbury, N.J.); Loctite series (e.g., 3492, 3175) UV cured acrylic adhesives available from Henkel Loctite Corp., 1001 Trout Brook Crossing, Rocky Hill, Conn. 06067 (www.loctite.com). OP series (e.g., 21, 4-20632, 54, 44) UV cured acrylic adhesives available from Dymax Corporation, Torrington, Conn.

Other useful adhesives include those compositions described in, e.g., U.S. Patent Application Publication No. 2004/0202879 (Xia et al.), which comprise at least one polymer with either an acid or base functionality that forms a pressure sensitive adhesive, a high $T_g$ polymer with an weight average molecular weight greater than 100,000 with an acid or base functionality, and a crosslinker, wherein the functionality on the pressure sensitive adhesive and the high $T_g$ polymer cause an acid-base interaction that forms a compatibilized blend. After accelerated aging of the adhesive composition at 80° C. and 90% relative humidity for approximately 500 hours in an oven, the adhesive mixture is translucent or optically clear.

Another useful adhesive includes microstructured adhesive, which includes a continuous layer of a pressure-sensitive adhesive having a microstructured surface, wherein the microstructured surface includes a series of features and wherein the lateral aspect ratio of the features range from about 0.1 to about 10, wherein the spacing aspect ratio of the features range from about 1 to about 1.9, and wherein each feature has a height of about 2.5 to about 375 micrometers. Such adhesives are described in, e.g., U.S. Pat. Nos. 5,650,215; 6,123,890; 6,315,851; 6,440,880; and 6,838,150.

Other useful adhesives include SOKEN™ 1885 PSA (commercially available from Soken Chemical & Engineering Co., Ltd, Japan), NEA PSA (as described in the Example 1 of U.S. Patent Application Publication No. 2004/0202879 (Lu et al.)), LENS BOND™ Type C59 (a thermally cured styrene based adhesive available from Summers Optical, Hatfield, Pa., a division of EMS Acquisition Corp., and NOA61™ (a UV cured thiol-ene based adhesive, available from Norland Company, Cranbury, N.J.).

If it is desired to have the layers affixed to each other, e.g., at a hinge region, the adhesive material used may promote permanent bonding, as that term is used herein. Examples of permanent bonding adhesive materials include, e.g., solvent-based adhesives, such as polyvinyl acetate (PVAc), ethylene-vinyl acetate, epoxy polymers, polychloroprene, polyurethane polymers, cyanocarylate polymers, acrylic polymers, polyester resins/polyurethane resins, polyols/polyurethane resin, and acrylic polymers/polyurethane resins.

To form a lift tab for one or more of the layers, all or a portion of a surface of the layer(s) (e.g., a corner of the layer(s) or at any point along an edge of one or more of the layer(s)) may be coated with a non-adhesive material (e.g., a varnish or adhesive deadener, such as EL242 (Pulse Roll Label Products, Bristol, UK)) that deadens the adhesive or, alternatively, may lack an adhesive coating. The lift tab facilitates user grasping and separation of the layers, including, e.g., the magnifying lens layer, from the other layers and/or from the device.

Methods for Manufacturing the Magnifying Lens Layer of the Scrolling Magnifier Device Methods for manufacturing the magnifying lens layer for use in the scrolling magnifier device of the invention are described in, e.g., U.S. Pat. No. 6,947,225, U.S. Pat. No. 7,767,728, U.S. Pat. No. 7,632,880, and U.S. Patent Application Publication No. 2010/0177406, each of which is incorporated by reference herein it its entirety. These methods include the use of high refractive index UV curable polymers for UV cast manufacturing of surface relief thin optical films. The methods described in the examples above may be optimized during manufacturing to improve the performance of the thin film magnifying lens by controlling properties of the embossing polymers and underlying film. Key aspects of the optimization include material characteristics such as transparency, temperature resistance, refractive index, antistatic properties, adhesion of embossing lacquers to base film, and the profile of the embossed microstructure.

The lens layer of the scrolling magnifier device can also be manufactured according to methods described in Worgull, "Hot Embossing: Theory and Technology of Microreplication," Publisher: William Andrew, 2009.

Master molds for manufacturing the magnifying lens (e.g., a Fresnel lens) of the lens layer can be produced using, e.g., precision diamond machining. Methods for diamond machining of components are described in, e.g., Davies et al. (Proc. of SPIE, 5183:94-108, 2003). In particular diamond turning can be used to produce patterns of grooves for the Fresnel lens on a micrometer or nanometer scale. The traditional mold manufacturing method, single point diamond turning, uses just one cutting tool to produce a constant structure across the mold surface. A variable structure can be produced using, e.g., diamond contouring, which involves raising and lowering the single point to achieve facets of variable depth.

Another method for manufacturing the magnifying thin film lens structure (e.g., a Fresnel lens) of the lens layer for incorporation into the scrolling magnifier device of the invention is included angle diamond turning (InADiT). InADiT achieves a lens structure in which the pitch and depth of the facets vary across the surface of the structure. InADiT produces variations in prism angle across the film that can be used to create, e.g., sharper definition at the troughs and peaks of micro facets, which significantly improves optical performance of the magnifying lens. In addition, InADiT can be used to produce magnifying lenses (e.g., Fresnel lenses) at significantly cheaper production cost relative to traditional cast lenses due to the continuous high speed production process. These magnifying lenses also do not suffer from inferior optical performance due to losses associated with the high number of micro facets used, which can be a drawback of using some cutting processes. InADiT can be used to produce thin film Fresnel lenses in both point focus and linear focus formats that exhibit optical efficiencies in excess of 85%.

The InADiT process involves the use of a cutting tool in which the apex angle of the smallest facet required in the structure is chosen. Larger facets are produced by moving the tool within the prism. This method produces facets with very sharp peaks and troughs with no rounding at the extremities. The precise movement of the cutting tool in the InADiT process can be achieved using co-ordinated axis motion, which allows the movement of the cutting tool to be accurately controlled along four different axes.

In an embodiment, the Fresnel lens of the scrolling magnifying device is 60 mm by 60 mm (width and length) and will magnify text at a distance of 1 to 3.5 cm. The target magnification is about 2× to about 3× at 3.0 cm. The lens may be produced on a 50 micron, PET film. The Fresnel lens will can have a structure with a focal depth of Fd=1 (e.g., for a 60 mm edge length structure the focal depth would be 60 mm). With this configuration, the magnification achieved would be as follows:

2× magnifications at 2.5 cm;
3× magnifications at 3.33 cm; and
at a distance of 1.25 cm the magnification would be 1.33×.

Tooling Development and Test Structure Production

A master mold for the proposed Fresnel lens structure could be produced by diamond turning and a copper-surfaced nickel master could be produced to manufacture the Fresnel lens. The master can be used to produce small batches of lenses.

For large quantities of lenses, the master can be replicated a number of times in nickel. The copies could then be welded together to produce a "shim." The shim can then be wrapped around a production drum and lenses produced in quantity. Lenses could be supplied on reels of about 300 m in length. If desired the lenses could be stamped out and supplied as individual units.

Uses of the Scrolling Magnifier Device

The scrolling magnifier device can be used as a standalone apparatus to magnifying printed indicia or it can be incorporated into or affixed to a composition or an article (e.g., a writing instrument, a checkbook, a journal, a map, a tablet, a wallet, a tie clip, a zipper pull (e.g., for jackets or backpacks), a book, a magazine, a product information sheet, advertising literature, promotional literature, a menu, an appliance, an electrical device, or a container) or article packaging. The device can be connected to any of these compositions using, e.g., a keychain or an attachment ring with a quick release.

Other Embodiments

With respect to the above description and examples, it should be readily apparent and obvious to one skilled in the art that the optimum construction of the scrolling magnifier device of the present invention may include variations in size, materials, shape, form, function, manner of operation, assembly, and use, and all equivalent relationships to those illustrated in the figures and described in the specification are intended to be encompassed by the present invention.

Although the figures illustrative of the invention show particular embodiments of the scrolling magnifier device, it is also envisioned that the scrolling magnifier device of the present invention is equally applicable to other forms of design or packaging.

All publications, patents, and patent applications mentioned in the above specification are hereby incorporated by reference. Various modifications and variations of the described method and system of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention that are obvious to those skilled in the art are intended to be within the scope of the invention.

Other embodiments are in the claims.

What is claimed is:

1. A device comprising
   a) a central spool having first and second ends;
   b) a scroll comprising a lens for magnifying indicia having first and second ends being wound onto said spool, wherein said second end of said scroll is fixedly attached to said spool and said first end of said scroll comprises a tab that allows said scroll to be extended from the spool by pulling thereon, wherein said scroll is wound onto said spool in a first position and is unwound from said spool in a second position; and
   c) a mechanism disposed on said first and/or second ends of said spool, wherein the scroll can be rewound to the first position after being extended to the second position.

2. The device of claim 1, wherein said device further comprises
   d) a central spindle having a first end that is oriented toward said first end of said spool and a second end that is disposed within a through bore of said spool, wherein said spool is rotatably disposed on said spindle.

3. The device of claim 1, wherein said mechanism is a spring or is a winch.

4. The device of claim 3, wherein said spring is present at one or both said ends of said spool.

5. The device of claim 2, wherein said mechanism is a spring and wherein said spring is disposed within the through bore of said spool.

6. The device of claim 1 further comprising an elongated housing having first and second opposing ends and a longitudinal slit disposed in the wall of the housing; wherein
   i) said central spool is disposed in said housing and said first end of said spool is oriented toward said first end of said housing; and
   ii) said first end of said scroll passes through said longitudinal slit of said housing, wherein said tab prevents said first end of said scroll from returning through said longitudinal slit into said housing.

7. The device of claim 1 further comprising a locking mechanism, whereby the scroll can be locked in the second position and then released from the second position to return to the first position.

8. The device of claim 1, wherein said lens is a Fresnel lens.

9. The device of claim 1, wherein said device is or is affixed to a writing instrument, a checkbook, a journal, a map, a tablet, a wallet, a tie clip, a book, a magazine, a product information sheet, advertising literature, promotional literature, a menu, an appliance, an electrical device, or a container.

10. The device of claim 1, wherein said scroll comprises printed matter.

11. The device of claim 1, wherein said scroll comprises a plastic material.

12. The device of claim 11, wherein said plastic material is polyurethane, vinyl, acrylic, polystyrene, polyethylene, or polycarbonate.

13. The device of claim 1, wherein said lens comprises a thickness of 0.2 millimeters (mm) or less.

14. The device of claim 1, wherein said lens comprises a magnifying strength in the range of about 1.2× to about 20×.

15. The device of claim 1, wherein the focal length of said lens layer is in the range of about 10 mm to about 80 mm.

16. The device of claim 1, wherein said lens is capable of magnifying said indicia when placed at a distance of about 5 mm to about 70 mm from said indicia.

17. The device of claim 1, wherein magnification of said indicia occurs by completely or partially extending said scroll to said second position.

18. The device of claim 1 further comprising a light source.

19. The device of claim 1, wherein said scroll comprises two or more layers.

20. An apparatus comprising the device of claim 1 affixed thereto.

* * * * *